United States Patent
Wilkins

(10) Patent No.: US 7,015,165 B2
(45) Date of Patent: *Mar. 21, 2006

(54) GRAPHITE LOADED SILICON CARBIDE AND METHODS FOR MAKING

(75) Inventor: Eric G. Wilkins, Bryant, AR (US)

(73) Assignee: CoorsTek, Inc., Golden, CO (US)

( * ) Notice: Subject to any disclaimer, the term of this patent is extended or adjusted under 35 U.S.C. 154(b) by 13 days.

This patent is subject to a terminal disclaimer.

(21) Appl. No.: 10/830,659

(22) Filed: Apr. 22, 2004

(65) Prior Publication Data

US 2005/0037915 A1    Feb. 17, 2005

Related U.S. Application Data

(63) Continuation of application No. 10/208,720, filed on Jul. 29, 2002, now Pat. No. 6,774,073.

(51) Int. Cl.
C04B 35/565    (2006.01)

(52) U.S. Cl. .......................... 501/90; 264/682
(58) Field of Classification Search ............... 264/682; 501/90
See application file for complete search history.

(56) References Cited

U.S. PATENT DOCUMENTS

| | | |
|---|---|---|
| 3,957,610 A | 5/1976 | Falkenburg et al. |
| 4,120,731 A | 10/1978 | Hillig et al. |
| 4,293,512 A | 10/1981 | Luhleich et al. |
| 4,391,450 A | 7/1983 | Beck |
| 4,514,346 A | 4/1985 | Luhleich et al. |
| 4,536,449 A | 8/1985 | Kennedy et al. |
| 4,572,848 A | 2/1986 | Pollak et al. |
| 4,633,051 A | 12/1986 | Olson |
| 5,395,807 A | 3/1995 | Divakar et al. |
| 5,422,322 A | 6/1995 | Chen et al. |
| 5,486,496 A | 1/1996 | Talbert et al. |
| 5,543,368 A | 8/1996 | Talbert et al. |
| 5,580,834 A | 12/1996 | Pfaff |
| 5,639,407 A | 6/1997 | Talbert et al. |
| 5,656,563 A | 8/1997 | Chen et al. |
| 5,702,997 A | 12/1997 | Dynan et al. |
| 5,707,567 A | 1/1998 | Pfaff |
| 5,840,639 A | 11/1998 | Shindle et al. |
| 5,902,760 A | 5/1999 | Dynan et al. |
| 5,972,818 A | 10/1999 | Dynan et al. |
| 5,975,407 A | 11/1999 | Gasse et al. |
| 5,976,429 A | 11/1999 | Chen et al. |
| 5,998,318 A | 12/1999 | Takanami et al. |

(Continued)

FOREIGN PATENT DOCUMENTS

DE    33 29 225 C2    2/1984

(Continued)

OTHER PUBLICATIONS

W/ Bocker et al., *Sintering of Alpha Silicon with Additions of Aluminum*, Powder Metallurgy International, vol. II, No. 2, 1979, pp. 83-85.

(Continued)

*Primary Examiner*—Mary Lynn Theisen
(74) *Attorney, Agent, or Firm*—Townsend and Townsend and Crew LLP

(57)    ABSTRACT

The invention provides exemplary silicon carbide ceramic bodies and processes for making such ceramic bodies. In one embodiment, a raw batch for producing a ceramic body includes a silicon carbide slurry and agglomerates of particles defining a dry lubricant mixture. The mixture includes a binder and a dry lubricant such as graphite, with a majority of the agglomerates having a shape that is generally spherical.

20 Claims, 3 Drawing Sheets

U.S. PATENT DOCUMENTS

| | | | |
|---|---|---|---|
| 6,162,543 | A | 12/2000 | Dubots et al. |
| 6,352,611 | B1 | 3/2002 | Han et al. |
| 6,398,991 | B1 | 6/2002 | Brazil et al. |
| 6,774,073 | B1 * | 8/2004 | Wilkins .................. 501/90 |

FOREIGN PATENT DOCUMENTS

| | | |
|---|---|---|
| EP | 0 165 584 A2 | 12/1985 |
| EP | 0 746 533 | 8/1995 |
| EP | 0 145 496 B2 | 5/1996 |
| EP | 0 906 896 A1 | 4/1999 |
| EP | 0 746 532 | 9/1999 |
| GB | 1 328 249 | 8/1973 |
| GB | 1 328 250 | 8/1973 |
| JP | 63-260861 | 10/1988 |

OTHER PUBLICATIONS

T. Fetahagic et al., *Microstructure Development in α-Sic*, Ceramica Acta, n. 2, 1990, pp. 31-37.

T. Mizrah et al., *Pressureless Sintering of a α-Sic*, Powder Metallurgy International, vol. 16, No. 5, 1984, pp. 217-220.

R. D. Nixon et al., *Correlation of steady-state creep and changing microstructure in polycrystalline SiC sintered with powder derived via gaseous reactants in an arc plasma*, J. Mater. Res., vol. 3, No. 5, Sep./Oct. 1988, pp. 1021-1030.

K. A. Schwetz et al., *The Effect Of Boron And Aluminum Sintering Additives On The Properties Of Dense Sintered Alpha Silicon Carbide*, Tenth International Coference "Science of Ceramics" (Sep. 1-4, 1979), Deutsch Keramische Gesellschaft, 1980, pp. 149-158.

Alan W. Weimer, *Carbide, Nitride and Boride Materials Synthesis and Processing*, Chapman & Hall, 1997, pp. 49-51.

*Purebid® PGS.-200 for Sealless Pump Bearing Components*, at http://www.mamat.com/Purebide%20PGS-200.html, Oct. 1, 2002.

*Purebide® PGS.-100 for Mechanical Seal Applications*, at http://www.mamat.com/Purebide%20PGS-100.html, Oct. 1, 2002.

*International Test Sieve Comparison Table 1994*, Harver & Boecker, 1994.

* cited by examiner

GRAPHITE LOADED SILICON CARBIDE AND METHODS FOR MAKING

RELATED APPLICATION

The present application is a continuation application of, and claims priority from U.S. patent application Ser. No. 10/208,720, filed Jul. 29, 2002 U.S. Pat. No. 6,774,073, entitled "GRAPHITE LOADED SILICON CARBIDE AND METHODS FOR MAKING," the complete disclosure of which is incorporated herein by reference for all purposes.

BACKGROUND OF THE INVENTION

The invention relates generally to the field of ceramic materials and processes for making ceramic materials. More specifically, the invention relates to silicon carbide bodies having particles or inclusions which are dispersed within the bodies.

Silicon carbide is useful in a wide variety of applications due to its tribological characteristics and its outstanding thermal, chemical and mechanical properties. Such applications include, for example, mechanical seals, valve lifters, and other applications where a part is frictionally engaged with another material. For example, in many mechanical seal applications, the seal interfaces are subjected to both a large compressive stress normal to the seal surface and to high rotational speeds or sliding velocities. Such conditions are typically represented by the parameter PV which represents the product of the compressive stress and the sliding velocity.

When such a mechanical seal is used in a pump or agitator, the mechanical seal should provide adequate sealing of the working fluid. Conveniently, the working fluid may also serve to lubricate and cool the seal interface. If sufficient lubrication and cooling is not provided, excessive wear or catastrophic failure of the mechanical seal may result. For example, if insufficient fluid is provided at the seal interface during operation, the lubricant can vaporize due to the heat produced and cause catastrophic failure.

Hence, when a silicon carbide body is used in a seal or other bearing face which runs against the face of another material, the seal or bearing face should be exposed to a lubricating and cooling fluid (or used in fluid applications) so that a film may be produced between the sliding surfaces to lubricate and cool the surfaces, thereby reducing friction, wear, and temperature as well as catastrophic failure potential. Further, proper lubrication will tend to minimize power consumption.

To facilitate proper lubrication, a variety of silicon carbide materials have been proposed. These include both reaction bonded silicon carbide materials and sintered silicon carbide materials with special modifications to the standard product. The reaction bonded silicon carbide materials are produced by placing a carbon containing preform in contact with molten silicon. As examples of such processes, U.S. Pat. Nos. 6,398,991, 4,536,449 and 4,120,731 describe reaction bonded silicon carbide bodies having secondary lubricating particles dispersed therein. The complete disclosures of these patents are herein incorporated by reference. Sintered silicon carbide materials are produced by combining a dry lubricant agglomerate and a silicon carbide matrix formulation, drying and compacting the mixture into a green body, and heating or sintering. An example of sintered silicon carbide is found in U.S. Pat. No. 5,656,563, the disclosure of which is herein incorporated by reference.

The above processes have met with limited success for a variety of reasons. For example, the processes used to produce such materials are often complex and can therefore be relatively expensive. For instance, as recognized in U.S. Pat. No. 5,656,563, it is difficult to incorporate large amounts of graphite into a ceramic matrix without causing cracks to occur in the microstructure or without increasing the material's porosity. The use of graphite or other dry lubricants with silicon carbide bodies tends to result in unwanted lamination of the bodies. Further, crushed dry lubricants typically produce irregular-shaped inclusions in the silicon carbide body. The irregular shaped particles, and their associated sharp edges, produce stress risers within the ceramic body, resulting in a weaker ceramic body and decreased tribological performance.

Hence, it would be desirable to provide silicon carbide materials having improved strength and stability, while maintaining the lubricity of the component. It would further be desirable to provide exemplary processes for making such materials. Such processes should be relatively simple so that the overall cost of the material may be reduced. Such a silicon carbide material should also be useful in applications having a high PV value or temporary dry running applications while reducing the chances of catastrophic failure, excessive wear, and power consumption.

BRIEF SUMMARY OF THE INVENTION

The invention provides exemplary silicon carbide ceramic bodies and processes for making such ceramic bodies. In one embodiment, the present invention provides a composite ceramic body having silicon carbide in major amount, and unreacted inclusions or agglomerates of a dry lubricant in minor amount. A majority of the inclusions are substantially spherical or ellipsoidal in shape, with the inclusions comprising between about two (2) percent and about twelve (12) percent of the ceramic body by volume.

In one aspect, the dry lubricant comprises graphite, and may include one or more types of graphite. Alternatively, other dry lubricants may be used, such as, boron nitride, titanium boride, aluminum nitride, and the like. The dry lubricant inclusions are dispersed throughout the silicon carbide matrix and provide a degree of lubricity when the ceramic body is operated against an operating surface.

In one aspect, the dry lubricant inclusions have an average nominal diameter or size that is between about ten (10) microns and about three hundred (300) microns. In another aspect, the inclusions comprise a primary lubricant, such as graphite, having an average size that is between about two (2) microns and about seven (7) microns. In a particular aspect, silicon carbide comprises alpha silicon carbide. Alternatively, the ceramic body includes beta silicon carbide, or some combination of alpha and beta silicon carbide. Ceramic bodies of the present invention may be used for a wide variety of applications. In a particular aspect, the ceramic body comprises a mechanical seal.

The present invention further provides exemplary raw batches for producing a composite ceramic body, and also exemplary methods for making the raw batch and ceramic body. In a particular embodiment, a raw batch of the present invention includes a silicon carbide slurry as a precursor to the silicon carbide matrix, and a plurality of agglomerates defining a dry lubricant inclusions mixture. The precursor slurry includes all needed ingredients, as known in the art, to make a dense sintered SiC ceramic body. The mixture includes a binder and a dry lubricant having an average particle size between about two (2) microns and about seven (7) microns. A majority of the agglomerates have a generally spherical shape.

In one aspect, the raw batch includes between about eighty (80) weight percent to about ninety-nine and one half (99.5) weight percent silicon carbide precursor slurry, between about one-half (0.5) weight percent to about twenty (20) weight percent dry lubricant agglomerates, and between about one-half (0.5) weight percent to about ten (10) weight percent binder. In a particular aspect, less than about three weight percent of binder is used. Again, the dry lubricant mixture includes graphite, in an embodiment, or other dry lubricant(s). In one aspect, the dry lubricant is not carbonized or carbon bonded, thus simplifying the raw batch preparation.

In alternative aspects, the binder is insoluble in water that is less than about fifty (50) degrees Celsius, or less than about ninety (90) degrees Celsius. In another aspect, the binder is soluble in water that is at least about ninety (90) degrees Celsius. In a particular embodiment, the binder has a demarcation temperature that is less than the boiling point of water, where the binder is soluble in water that is above the demarcation temperature, but insoluble in water that is below the demarcation temperature.

In one embodiment of the present invention, a method of making a raw batch for producing a composite ceramic body includes preparing a dry lubricant slurry and preparing a binder. The dry lubricant slurry and binder are mixed and dried to form a dry powder or mixture having a plurality of agglomerates. A majority of the agglomerates have a shape that is generally spherical.

In one aspect, the dry lubricant mixture is spray dried, although other drying methods also may be used within the scope of the present invention. In a particular aspect, the agglomerates have a size between about thirty (30) microns and about one hundred and twenty (120) microns. It will be appreciated by those skilled in the art that other sizes of agglomerates also fall within the scope of the present invention.

In one aspect, the method of making a raw batch mixture further includes mixing the dry mixture with a silicon carbide slurry. In one embodiment, the silicon carbide slurry includes a water based slurry. In one aspect, the water based slurry includes all needed sintering aids, disperants, lubricants, and binders to make a dense sintered silicon carbide matrix. In one aspect, the silicon carbide slurry includes alpha-silicon carbide. Alternatively, beta-silicon carbide may be used.

In one aspect, the silicon carbide slurry is less than about ninety (90) degrees Celsius. In another aspect, the silicon carbide slurry is less than about fifty (50) degrees Celsius. In this manner, the binder does not dissolve in the silicon carbide slurry, thus facilitating the retention of substantially spherical or ellipsoidal dry lubricant agglomerates.

In one aspect, the method further includes drying the combined dry mixture and silicon carbide slurry, and forming a ceramic body therefrom. This process may include, for example, green compaction forming techniques, machining with single point tooling, heating, firing or sintering the material, grinding with diamond tools, and the like. The ceramic body may comprise, for example, a pump seal, a bearing, a valve component, a turbine component, a pump lifter, a nozzle, or the like.

Other objects, features and advantages of the present invention will become more fully apparent from the following detailed description, the appended claims and the accompanying drawings.

DESCRIPTION OF THE SPECIFIC EMBODIMENTS

The invention provides exemplary silicon carbide composite ceramic bodies and methods for producing such silicon carbide composite ceramic bodies. In a broad sense, the ceramic bodies of the present invention comprise a dry lubricant that is dispersed into a silicon carbide matrix. The resulting ceramic body includes an exemplary microstructure, resulting in a robust and durable product which retains the lubricant, and has a density of at least about 2.50 grams per cubic centimeter (g/cc), and more preferably at least about 2.75 g/cc. The dry lubricant may serve as a lubricant in operations where the ceramic body is in sliding contact with another surface. In this manner, the time to failure in the event of dry running is increased and the risk of dry running the part is mitigated. Wear and power consumption are also reduced.

Merely by way of example, silicon carbide ceramic bodies produced according to the invention are useful in a wide variety of applications. For example, the ceramic bodies of the invention are useful in applications where having a high PV is a requirement. Such applications can include, for example, seal members, bearings, pump lifters, turbine components, valve guides, split seals, and the like. The dry lubricant inclusions reduce the frictional drag on a mating surface through intrinsic lubricating properties or hydrodynamic effects. The inclusions may also act as liquid reservoirs in the event that the inclusion wears below the matrix surface. This provides a hydrodynamic lift, "hydropad," which causes slight separation of the faces and thus reduces wear and friction. Further, inclusions in one embodiment of the present invention are substantially spherical, which further enhances the hydropad effect and improves tribological performance. The dry lubricant inclusions may be provided with essentially any size. In this way, the amount of lubricity may be modified by altering the size and concentration of the inclusions.

Figure 1:
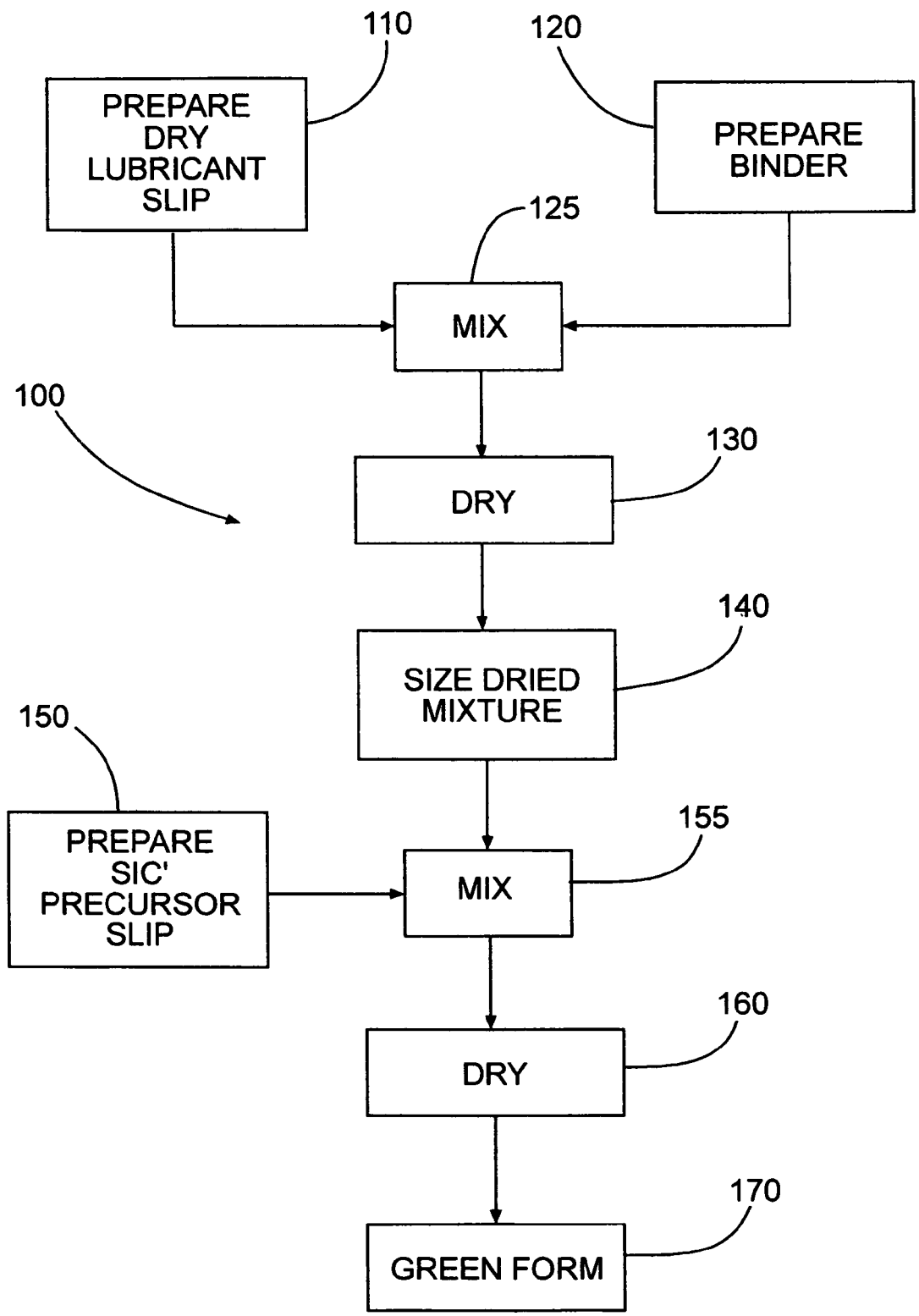
FIG. 1 is a flowchart illustrating an exemplary process for producing a silicon carbide body according to an embodiment of the present invention.

Referring now to FIG. 1, an exemplary method 100 for producing a silicon carbide composite ceramic body will be described. Method 100 includes preparation of a dry lubricant slurry or SLIP 110. The dry lubricant SLIP includes one or more dry lubricant materials such as, for example, a carbon source, boron nitride, titanium boride, aluminum nitride, and the like. In a particular embodiment, the dry lubricant material comprises one or more carbon sources such as graphite, carbon black, pyrolized resins, and the like. In some embodiments, the dry lubricant comprises one or more types or sizes of graphite. In a particular embodiment, KS-6 and KS-25 graphites are used, having a mean particle size of between about two (2) microns and about seven (7) microns. Such graphites are available from Timcal, Ltd., the Graphite Business Unit of Imerys.

The dry lubricant SLIP 110 includes the dry lubricant(s) combined with water (such as deionized water), an organic chemical (such as alcohol), and a dispersant. In a particular embodiment, the alcohol used is octanol and the dispersant is Mapeg 600, available from BASF, Corporation. Dry lubricant SLIP 110 further includes a resin and a base. In a particular embodiment, the base comprises one normal (1 N) ammonia. Further, in a particular embodiment, the resin comprises a resol phenolic resin, such as SP6877 available from Schenectady International, of Schenectady, N.Y. It will be appreciated by those skilled in the art that other organic chemicals, dispersants, bases and resins also may be used within the scope of the present invention.

Method 100 includes the preparation of a binder 120. Binder 120 includes deionized water and an organic fugitive binder. The invention may employ the use of a wide variety of organic binders including hydroxy ethyl cellulose (HEC), methyl ethyl cellulose (MEC), polyvinyl alcohol (PVA), polyethylene glycol (PEG), methyl propyl cellulose, carboxy methyl cellulose, acrylic resin, coal tar pitch, long chain fatty materials, metallic stearates, sugars, starches, alginates, polystyrene, cellulose acetate, epoxy resins, vinyl resins, and the like. In a particular embodiment, the organic fugitive binder comprises polyvinyl alcohol (PVA), such as PVA7006 available from DuPont. Such a binder is generally insoluble in water or aqueous-based solutions having a temperature of less than about eighty-eight (88) or ninety (90) degrees Celsius. This feature helps produce ceramic components having desired characteristics as provided herein.

Other aqueous insoluble binders include wax, ethyl cellulose, polyethylene, polyvinyl butyral and the like. The deionized water and organic fugitive binder are combined to prepare binder 120. In a particular embodiment, the deionized water and organic fugitive binder are combined at a temperature between about ninety (90) degrees Celsius and about one hundred (100) degrees Celsius.

Method 100 includes mixing 125 the dry lubricant SLIP 110 and binder 120. In a particular embodiment, mixing 125 comprises a moderate shear mixing technique. In a particular embodiment, the dry lubricant SLIP and binder mixture contains between about ten (10) weight percent (wt %) and about forty (40) wt % of graphite, between about zero (0) wt % and about three (3) wt % of alcohol, between about one-quarter (0.25) wt % and about three (3) wt % of dispersant, between about one-quarter (0.25) wt % and about three (3) wt % of base, between about zero (0) wt % and about three (3) wt % of resin, between about one (1) wt % and about ten (10) wt % of binder, and between about fifty-five (55) wt % and about eighty (80) wt % of deionized water before drying. In a particular embodiment, the dry lubricant SLIP and binder mixture comprises less than about three (3) wt % binder.

The combined dry lubricant SLIP 110 and binder 120 are then dried 130. Drying techniques according to the present invention include spray drying, such as by employing a Bowen commercial spray dryer. Alternatively, a variety of drying processes may be used as known in the art, including flash drying, spin drying, fluidized beds, and the like.

Preferably, drying 130 produces substantially spherical agglomerates made up of the dry lubricant, binder and other materials remaining after drying. Such shapes may be obtained, for example, by spray drying or roll compaction. Due in part to the aqueous nature of the precursor SLIP, spray drying may be used without the risk of explosion as may otherwise occur with organic or solvent-based slurries. The dry mixture is then sized 140 to remove unwanted agglomerate sizes. Sizing may occur, for example, by screening, air classification, or the like. In a particular embodiment, the agglomerates remaining after sizing are between about ten (10) microns and about three hundred (300) microns. In another embodiment, the agglomerates are between about thirty (30) microns and about one hundred and twenty (120) microns. Other size agglomerates also are within the scope of the present invention.

The sized agglomerates or dry mixture then may be used to form a ceramic body by a number of techniques. For example, the dry mixture may be added to an extrusion paste, an injection molding body, a SLIP casting body, SiC precursor agents, and the like. In a particular embodiment, the dry mixture is added to a silicon carbide precursor SLIP.

In one embodiment, method 100 further includes preparing a silicon carbide precursor SLIP 150. In a particular embodiment, precursor SLIP 150 comprises alpha silicon carbide in an aqueous or water-based slurry. In another embodiment, precursor SLIP 150 comprises beta silicon carbide, or some combination of alpha and beta silicon carbide. Precursor SLIP 150 includes silicon carbide and all needed sintering aids, dispersants, lubricants and binders to make a dense sintered SiC matrix. Exemplary precursor SLIPs 150 include SC30, commercially produced by CoorsTek, Inc. of Golden, Colo., although other precursor SLIPs may be used within the scope of the present invention.

The silicon carbide precursor SLIP 150 is then mixed 155 with the sized dry lubricant mixture. Mixing 155 is preferably a low shear mixing, such as by adding the dry lubricant mixture to the water based precursor SLIP 150 and stirring. In one embodiment, the temperature of precursor SLIP 150 is less than about eighty-eight (88) degrees or less than about ninety (90) degrees Celsius when the dry lubricant mixture is added. In another embodiment, the temperature of SLIP 150 is less than about fifty (50) degrees Celsius when the dry lubricant mixture is added. In a particular embodiment, the temperature of SLIP 150 is in a temperature range in which binder 120 is insoluble. In this manner, the dry lubricant mixture does not separate or dissociate when added to SLIP 150. This process, in one embodiment, helps retain the generally spherical nature of the dry mixture agglomerates.

The resulting raw batch mixture is then dried 160. In a particular embodiment, drying 160 comprises a spray drying. Due in part to the aqueous nature of the precursor SLIP, spray drying may be used without the risk of explosion as may otherwise occur with organic or solvent-based slurries. Further, the use of a water based precursor SLIP, in combination with binders according to the present invention, encourages the retention of substantially spherical or ellipsoidal dry lubricant agglomerates. This occurs at least in part because the dry mixture 140 is insoluble in precursor SLIP 150 so that the dry mixture does not disperse into its primary particles. In this manner, the size of the agglomerates or inclusions within the ceramic body may be precisely controlled. Preferably, the dry lubricant agglomerates will be bonded to the silicon carbide matrix, to firmly retain the agglomerates therein.

Once dried, the raw batch may be compacted and green formed 170, according to any standard compaction and green forming technique. In some embodiments, prior to green forming, the ceramic slurry is agitated at low shear in a commercially available mixer under vacuum conditions for about 4 hours to about 15 hours, and more preferably for about 6 to about 10 hours. As one example of green forming which is particularly useful when forming a seal member, the raw batch mixture is placed into a rubber sack having a mandrel and then compacted using a commercially available isostatic press. Any one of a variety of commercially available compaction forming techniques may be used in place of isostatic pressing. For example, the raw batch mixture may be compressed using isostatic pressing, uniaxial pressing, extrusion, hot pressing, and the like.

In another embodiment, the green body is delivered into a synthetic or plaster mold using a commercially available casting apparatus and may be subjected to pressure from about 70 psig to about 600 psig, or more preferably from about 220 psig to about 580 psig, for about 10 seconds to about 240 seconds, or more preferably for about 60 seconds to about 120 seconds. In accordance with this embodiment, the mold should be porous, having a pore size from about 2 microns to about 20 microns, or more preferably from about 2 microns to about 6 microns. Casting the green bodies using a porous mold forces water out of the green body, reducing its moisture content and imparting additional structural integrity. A number of compaction techniques may be used within the scope of the present invention, including, for example, slip casting, pressure casting, vacuum casting, and the like. Additional details on green forming and other manufacturing techniques may be found in U.S. application Ser. No. 09/602,798, assigned to the assignee of the present invention, the complete disclosure of which is incorporated herein by reference.

Following green forming, the green body may be subject to further processes known to those skilled in the art to produce a ceramic body as specified by an end user. Such processes include, for example, machining with single point tooling, heating, firing or sintering the material, grinding with diamond tools, and the like. In one embodiment, the green body is machined, such as with single point tooling, and heated or fired. Firing of the green body results in the shrinking and densification thereof. In one embodiment, ceramic bodies of the present invention further have an average density of at least about 2.5 g/cc, and more preferably at least about 2.75 g/cc, producing a dense body that is impermeable to fluids. The high density also contributes to the stiffness, hardness, flexural strength, thermal conductivity, abrasion resistance, and other physical characteristics that allow the material to be used as a mechanical seal, among other applications. In one embodiment, the hardness of the ceramic body may be greater than about twenty-six (26) GPa. In this way, such bodies may be used in applications having high PV requirements.

If needed or desired, additional process may be performed, such as grinding with diamond tools or abrasives, or the like.

Figure 2A:
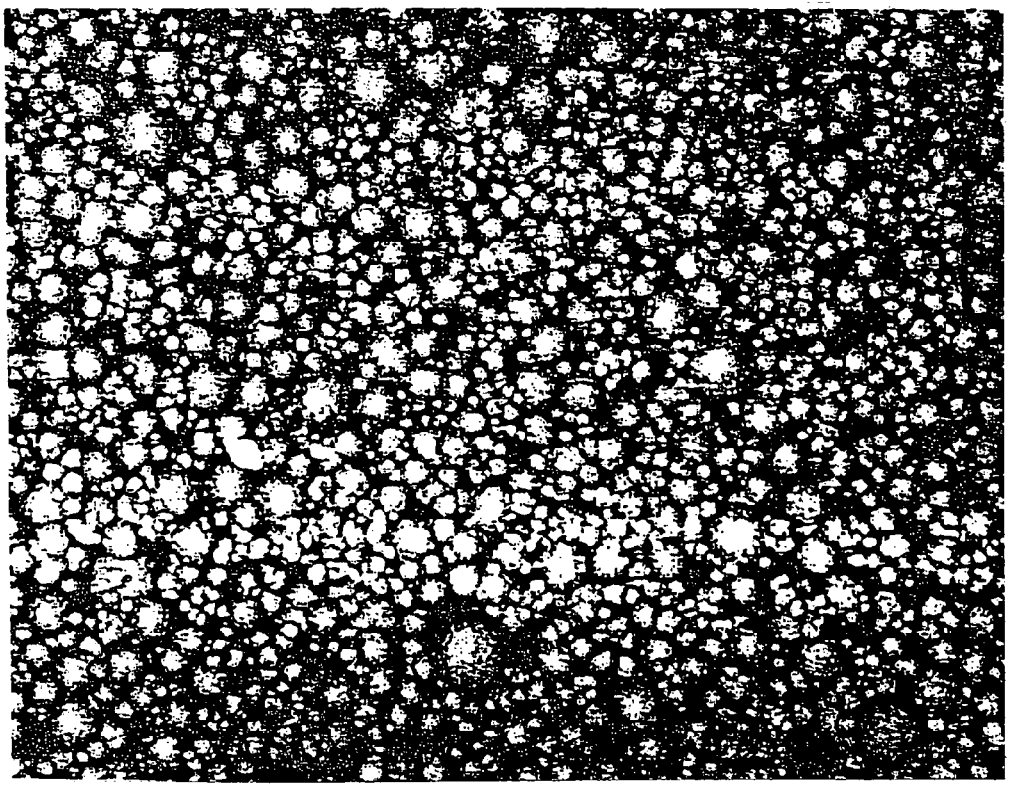
FIG. 2A is a magnified depiction of a dry lubricant mixture according to the present invention.
Figure 2B:
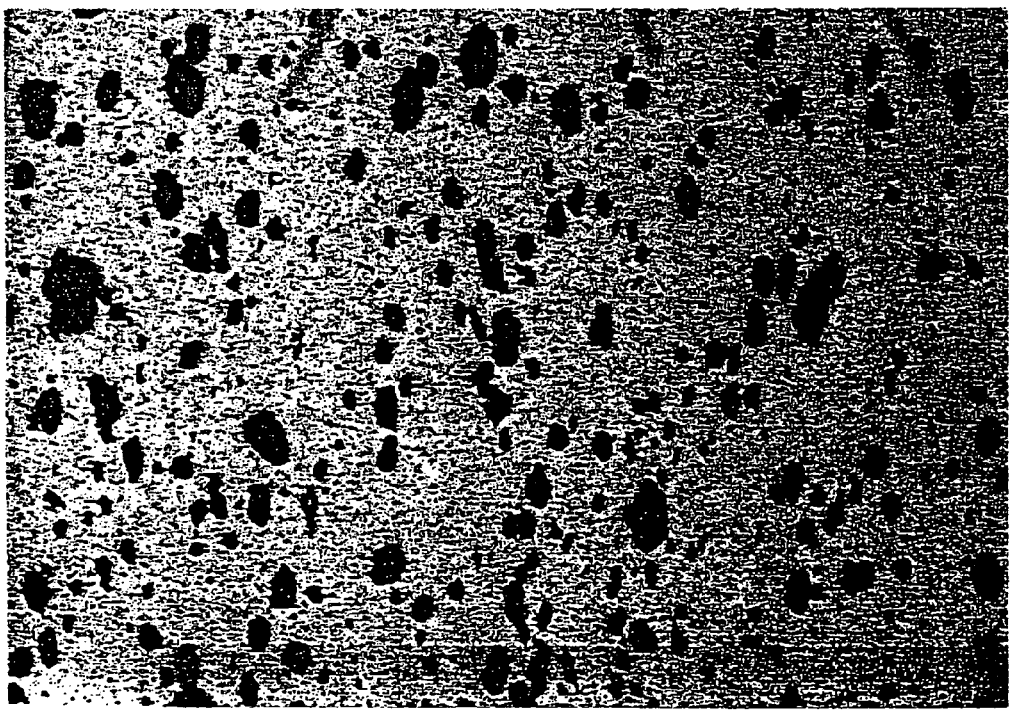
FIG. 2B is a magnified depiction of dry lubricant inclusions in a silicon carbide body according to an embodiment of the present invention.

One advantage of the present invention involves retention of substantially spherical or ellipsoidal dry lubricant inclusions in the end product or ceramic body. FIG. 2A is a magnified depiction of dry mixture 140. As can be seen in FIG. 2A, at least some of the agglomerates are substantially spherical or ellipsoidal in shape. In a particular embodiment, the majority of the dry mixture agglomerates are substantially spherical, with some of the substantially spherical agglomerates becoming compressed during compaction and green forming, to result in some substantially ellipsoidal agglomerates. FIG. 2B depicts a dense sintered ceramic component after drying 160 and subsequent process steps. Dry lubricant agglomerates or inclusions may be seen within the resulting ceramic body. In one embodiment, the inclusions comprise between about two (2) percent and about twelve (12) percent of the ceramic body by volume. Preferably, the inclusions are spaced generally uniformly throughout the ceramic component, and are substantially free from adjacent or abutting inclusions.

Again, in one embodiment, a majority of the dry lubricant agglomerates are substantially spherical or ellipsoidal in shape. In another embodiment, a majority of the inclusions or agglomerates have substantially curved or smooth surfaces, but may not be geometrically spherical or ellipsoidal. As a result of the present invention, irregular shaped inclusion edges and surfaces are reduced or avoided, and thus stress risers are reduced or avoided in the resultant ceramic body. Such ceramic bodies also have greater strength and increased tribological performance than ceramic bodies having cavities or holes disposed throughout. Further, the generally round shape contributes to the hydrodynamic forces which improve seal performance.

Figure 3:
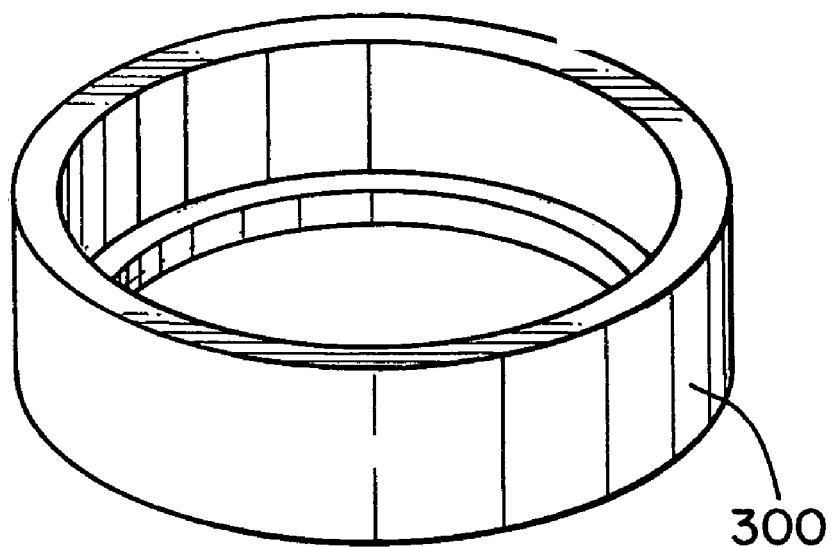
FIG. 3 illustrates an exemplary seal member that is constructed of a silicon carbide body according to the present invention.

Shown in FIG. 3 is a seal member 300 that may be produced according to the processes described herein. In addition to producing seal members, the processes of the invention may be employed to produce bearings, valves, nozzles, valve guides, split seals, and other wear parts.

The invention has now been described in detail. However, it will be appreciated that the invention may be carried out in ways other than those illustrated in the aforesaid discussion. Accordingly, the scope of this invention is not to be limited by those specific examples, but rather is to be accorded the full scope represented in the following claims.

What is claimed is:

1. A method of making a raw batch for producing a composite ceramic body, the method comprising:
    preparing a dry lubricant slurry;
    preparing a binder;
    mixing the dry lubricant slurry and the binder; and
    drying the combined dry lubricant slurry and the binder to form a dry mixture having a plurality of agglomerates;
    wherein a majority of the plurality of agglomerates have a shape that is generally spherical; and
    wherein the binder has a demarcation temperature that is less than the boiling point of water, and wherein the binder is soluble in water that is above the demarcation temperature and insoluble in water that is below the demarcation temperature.

2. The method as in claim 1 further comprising preparing the binder and mixing the dry lubricant slurry and binder at a temperature greater than the demarcation temperature.

3. The method as in claim 1 wherein the dry lubricant slurry comprises a graphite.

4. The method as in claim 1 further comprising mixing the dry mixture with a silicon carbide precursor slurry at a temperature that is below the demarcation temperature.

5. A method of making a ceramic component, the method comprising:
    preparing a dry lubricant mixture, the dry lubricant mixture comprising:
    a dry lubricant; and
    a binder, the binder having a demarcation temperature, and wherein the binder is soluble in water that is above the demarcation temperature and insoluble in water that is below the demarcation temperature; and
    combining the dry lubricant mixture with a silicon carbide precursor slurry;
    wherein the preparing the dry lubricant mixture occurs at a temperature above the demarcation temperature, and the combining of the dry lubricant mixture with the silicon carbide precursor slurry occurs at a temperature below the demarcation temperature.

6. The method as in claim 5 wherein the dry lubricant mixture comprises a plurality of generally spherical agglomerates having a size between about thirty (30) microns and about one-hundred and twenty (120) microns.

7. The method as in claim 5 wherein the demarcation temperature is a temperature between about eighty-eight degrees Celsius (88° C.) and about ninety degrees Celsius (90° C.).

8. The method as in claim 5 wherein the dry lubricant comprises a graphite, the graphite having an average particle size between about two (2) microns and about seven (7) microns.

9. The method as in claim 5 further comprising drying the combined dry lubricant mixture and silicon carbide precursor slurry, and forming a ceramic body therefrom.

10. The method as in claim 9 wherein forming the ceramic body comprises forming the ceramic body using a green compaction forming technique.

11. The method as in claim 9 wherein the ceramic body is a bearing.

12. The method as in claim 9 wherein the ceramic body is a pump seal.

13. The method as in claim 9 wherein the ceramic body has a generally uniform distribution of dry lubricant inclusions.

14. The method as in claim 13 wherein a majority of the dry lubricant inclusions are generally spherical or ellipsoidal in shape.

15. The method as in claim 13 wherein the dry lubricant inclusions comprise between about two (2) percent and about twelve (12) percent of the ceramic body by volume.

16. The method as in claim 13 wherein the generally uniform distribution of dry lubricant inclusions is substantially free of a lamination effect.

17. The method as in claim 13 wherein the dry lubricant inclusions comprise a graphite.

18. A composite ceramic body, comprising:
    silicon carbide in major amount; and
    unreacted inclusions of a dry lubricant in minor amount, wherein a majority of the inclusions are substantially spherical or ellipsoidal in shape, the inclusions comprising between about two (2) percent and about twelve (12) percent of the ceramic body by volume;
    wherein the inclusions are substantially free of abutting inclusions to prevent a lamination effect in the ceramic body.

19. The composite ceramic body as in claim 18 wherein the majority of the inclusions have a nominal diameter that is less than one-hundred (100) microns.

20. The composite ceramic body as in claim 18 wherein the inclusions of dry lubricant comprise a graphite inclusion.

* * * * *